United States Patent [19]

Carlton et al.

[11] Patent Number: 5,669,309

[45] Date of Patent: Sep. 23, 1997

[54] ACCUMULATING CONVEYOR SYSTEM

[75] Inventors: Lawrence Curtis Carlton, Lansing; Kenneth Darrow Kuhn, Fenton, both of Mich.

[73] Assignee: General Motors Corporation, Detroit, Mich.

[21] Appl. No.: 633,341

[22] Filed: Apr. 17, 1996

[51] Int. Cl.⁶ .................................................. B61B 13/00
[52] U.S. Cl. ........................ 104/162; 104/118; 104/172.1
[58] Field of Search ................................. 104/48, 91, 118, 104/119, 130.1, 162, 172.1, 172.3; 105/141, 144; 198/347.1

[56] References Cited

U.S. PATENT DOCUMENTS

| | | | |
|---|---|---|---|
| 4,359,149 | 11/1982 | Erlichman et al. | 198/347.1 |
| 4,548,135 | 10/1985 | Kupczyk | 104/48 |
| 4,860,663 | 8/1989 | Naruse et al. | 104/162 |
| 5,042,392 | 8/1991 | Brethorst | 104/162 |
| 5,048,426 | 9/1991 | Burt et al. | 104/91 |

*Primary Examiner*—S. Joseph Morano
*Attorney, Agent, or Firm*—Charles E. Leahy

[57] ABSTRACT

An accumulating conveyor system for shuttling conveyor trucks along a conveyor track from a drop off point at the end of a first conveyor drive to a point at the beginning of a second conveyor drive. The accumulating conveyor system includes a drive track which extends parallel along the conveyor track. A plurality of tractors ride along the drive track and selectively couple with a truck at the drop-off point, then tow the truck along the conveyor track to the pick-up point of the second conveyor drive where the tractor uncouples from the truck. A return track extends parallel along the drive track for enabling return of the tractors from the pick-up point to the drop-off point. A switch mechanism transfers the trucks from the drive track to the return track and then back to the drive track.

7 Claims, 6 Drawing Sheets

ACCUMULATING CONVEYOR SYSTEM

The invention relates to a conveyor system, and more particularly an accumulating conveyor for shuttling conveyor trucks between first and second, spaced apart conveyor drives to insulate each conveyor drive from a stoppage of the other conveyor drive.

BACKGROUND OF THE INVENTION

It is well known in motor vehicle assembly plants to convey a truck carrying a vehicle body along an assembly line. The truck has wheels which ride on tracks mounted on the floor. A loop of conveyor drive chain pushes the truck along the track. For a short assembly line, a single drive chain can be used to push the trucks, while in larger assembly plants, several separate conveyor drive chain loops are used and the separate loops have motor drives which are synchronized together via tachometer feedback so that the trucks are conveyed through the assembly plant at a constant speed and constant spacing relative one another. A disadvantage of such conventional conveyor systems is that a stoppage of one of the conveyor drive chains requires that all of the other drive chain loops also stop.

The industry has recognized the advantage of having high speed accumulating transfer conveyors positioned between two separate conveyor drive chains in order to provide a buffer between the conveyor drive chain loops. Consequently, a stoppage of one conveyor drive chain loop can be accommodated without stopping the other conveyor drive chain loop.

SUMMARY OF THE INVENTION

The present invention provides a new and improved accumulating conveyor. According to the invention, a first conveyor drive drives trucks along the conveyor track to a drop off point. A second conveyor drive is spaced at a distance from the first conveyor drive at a pick-up point. An accumulating conveyor system is provided for shuttling the conveyor trucks from the first conveyor drive to the second conveyor drive. The accumulating conveyor system includes a drive track which extends parallel along the conveyor track between the drop-off point and the pick-up point. A plurality of tractors ride along the drive track and selectively couple with a truck at the drop-off point, then tow the truck along the conveyor track to the pick-up point of the second conveyor drive where the tractor uncouples from the truck. A return track extends parallel along the drive track for enabling return of the tractors from the pick-up point to the drop-off point. A switch mechanism transfers the trucks from the drive track to the return track and then back to the drive track. The coupling mechanism includes an arm which reaches out from the tractor into the path of movement of the truck. A pin and socket are provided respectively on the truck and the arm for engagement with one another to couple the tractor arm to the truck. An entry ramp of the arm is engaged by the truck to pivot the arm to accomplish a coupling of the pin and socket at the drop-off point. When the truck reaches the pick-up point, the tractor arm is pushed down to disengage the pin and socket so that the truck can be carried away by the second conveyor drive.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENTS

Figure 1:
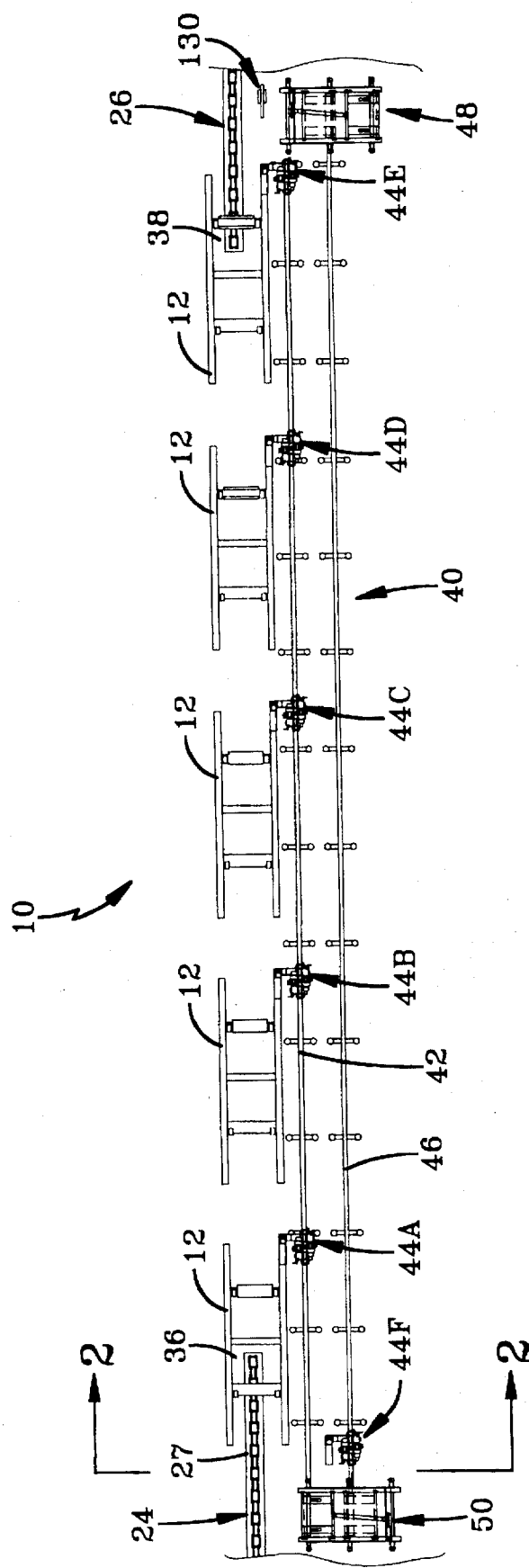
FIG. 1 is a plan view of the accumulating conveyor system of this invention.
Figure 2:
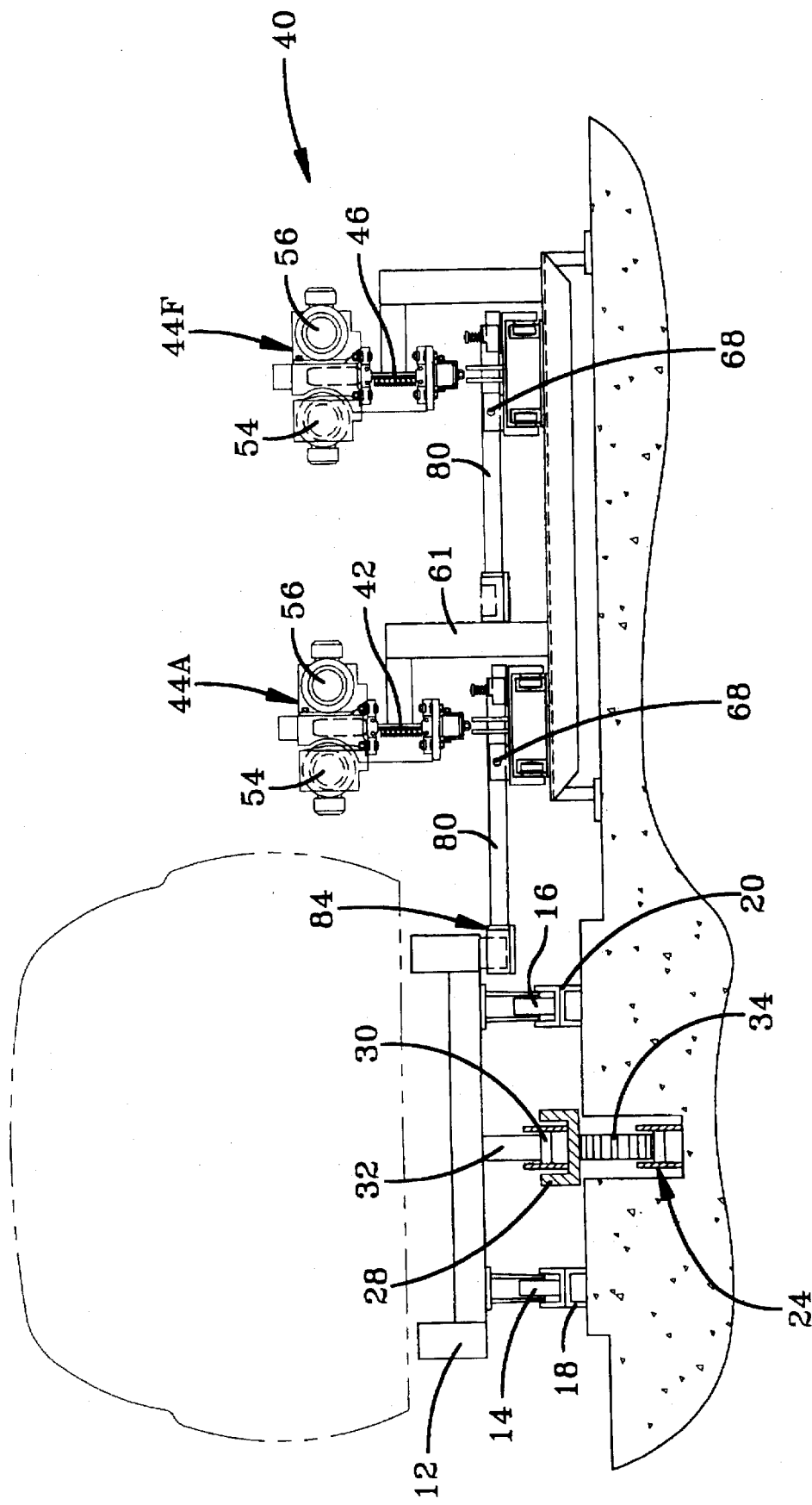
FIG. 2 is a section view taken in the direction of arrows 2—2, showing a tractor on the drive track and a tractor on the return track.

Referring to FIG. 1, an assembly line 10 includes a plurality of trucks 12 which carry vehicle bodies (not shown) and are conveyed through the vehicle assembly plant or other factory. Each truck has left wheels 14 and right wheels 16 engaged within floor mounted tracks 18 and 20, as best shown in FIG. 2.

Referring again to FIG. 1, the trucks 12 are conventionally conveyed through the assembly plant by a first conveyor drive 24 and second conveyor drive 26. As seen in FIG. 2, the first conveyor drive 24 has a chain 27 which rides within a chain track 28 and carries pusher bars 30 which push against a leg 32 reaching down from the truck 12 so that the chain 27 pushes the truck 12 through the assembly plant. The chain 27 is formed in a loop and goes around a sprocket 34 mounted in the floor to disengage from the truck 12 and at a drop-off point, designated generally at 36. As seen in FIG. 1, the second conveyor drive 26 is spaced substantially away from the first conveyor drive 24 by about five truck lengths. The drive chain of the second conveyor drive 26 rises from the floor at a pick-up point, generally indicated at 38, to engage with a truck 12 and then carry the truck along the second conveyor drive.

An accumulating conveyor system is provided for carrying the trucks 12 from the drop-off point 36 of the first conveyor drive 24 to the pick-up point 38 of the second conveyor drive 26. As seen in FIG. 1, the accumulating conveyor system 40 includes a drive track 42 which extends parallel along the path of the trucks 12, a plurality of individually powered tow tractors 44 (including tractors 44A, 44B, 44C, 44D, 44E and 44F) for carrying the trucks 12 from the drop-off point 36 to the pick-up point 38, a return track 46 for delivering the tractors 44 from the pick-up point 38 back to the drop-off point 36, and a pair of track end switch devices 48 and 50 for transferring the tractors 44 between the drive track 42 and return track 46.

Figure 4:
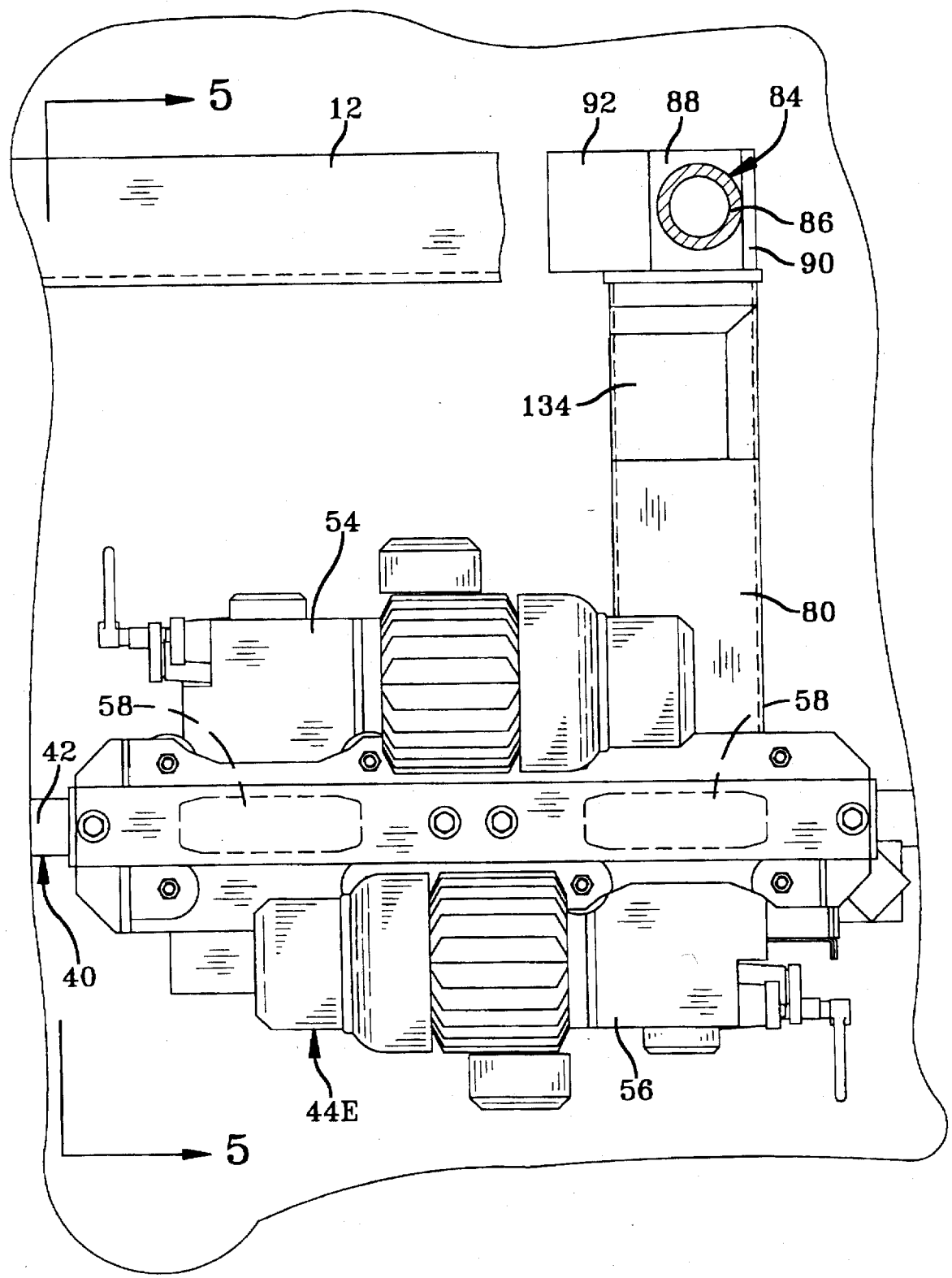
FIG. 4 is a enlarged plan view of the tractor and its arm for coupling with the truck.
Figure 5:
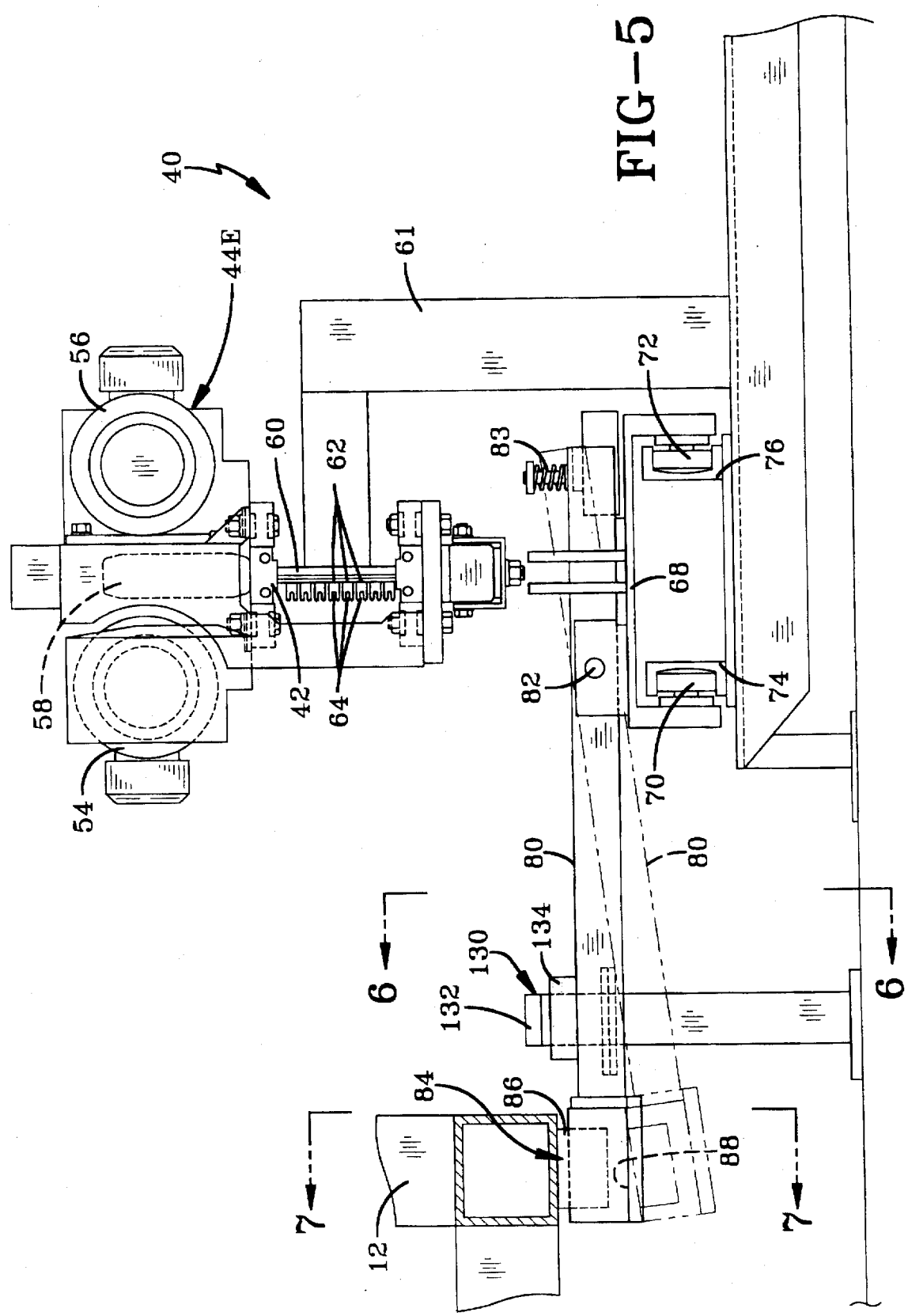
FIG. 5 is an elevation view of the tractor on the drive track with the coupling arm coupled with the truck.

As seen in FIGS. 4 and 5, the typical drive tractor 44 includes a pair of motors 54 and 56 which power a drive wheels 58 to power the tractor 44 along the drive rail 42. An electrical rail 60 is mounted with the drive rail 42 via a support frame 61 and carries a plurality of electrical conductors 62. The tractor 44 carries a plurality of electrical conductor contacts 64 which ride on the conductors 62 of the electrical rail 60 to receive power and control signals from a central conveyor control panel to permit individual control of the speed, direction, stopping, and starting of the tractors 44.

As seen in FIGS. 2 and 4, the tractor 44 includes a trolley 68 having left wheels 70 and right wheels 72 which ride in channel tracks 74 and 76 mounted on the support frame 61. A coupler arm 80 is connected to the trolley 68 by a pivot 82 and reaches into the path of the truck 12. A spring assembly 83 pushes down on the end of arm 80 to normally hold the arm 80 upward at its solid line condition of FIG. 5.

Figure 7:
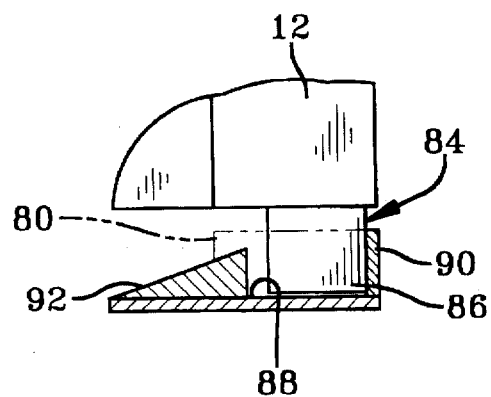
FIG. 7 is a section view taken in the direction of arrows 7—7 of FIG. 5.

As best seen in FIGS. 4, 5 and 7, a pin and socket arrangement, generally indicated at 84, is provided to couple the arm 80 with the truck 12. In particular, the truck 12 has a circular pin 86 which depends downwardly from the lower side of the truck. The arm 80 has a socket 88 at the end thereof, including an end wall 90 and entry ramp 92. FIGS. 2, 4, 5 and 7 show the pin 86 of the track captured within the socket 88 of the tractor arm 80 so that the tractor 44 is coupled with the truck 12 to drive the truck along the plant from the drop-off point 36 to the pick-up point 38.

Figure 3:
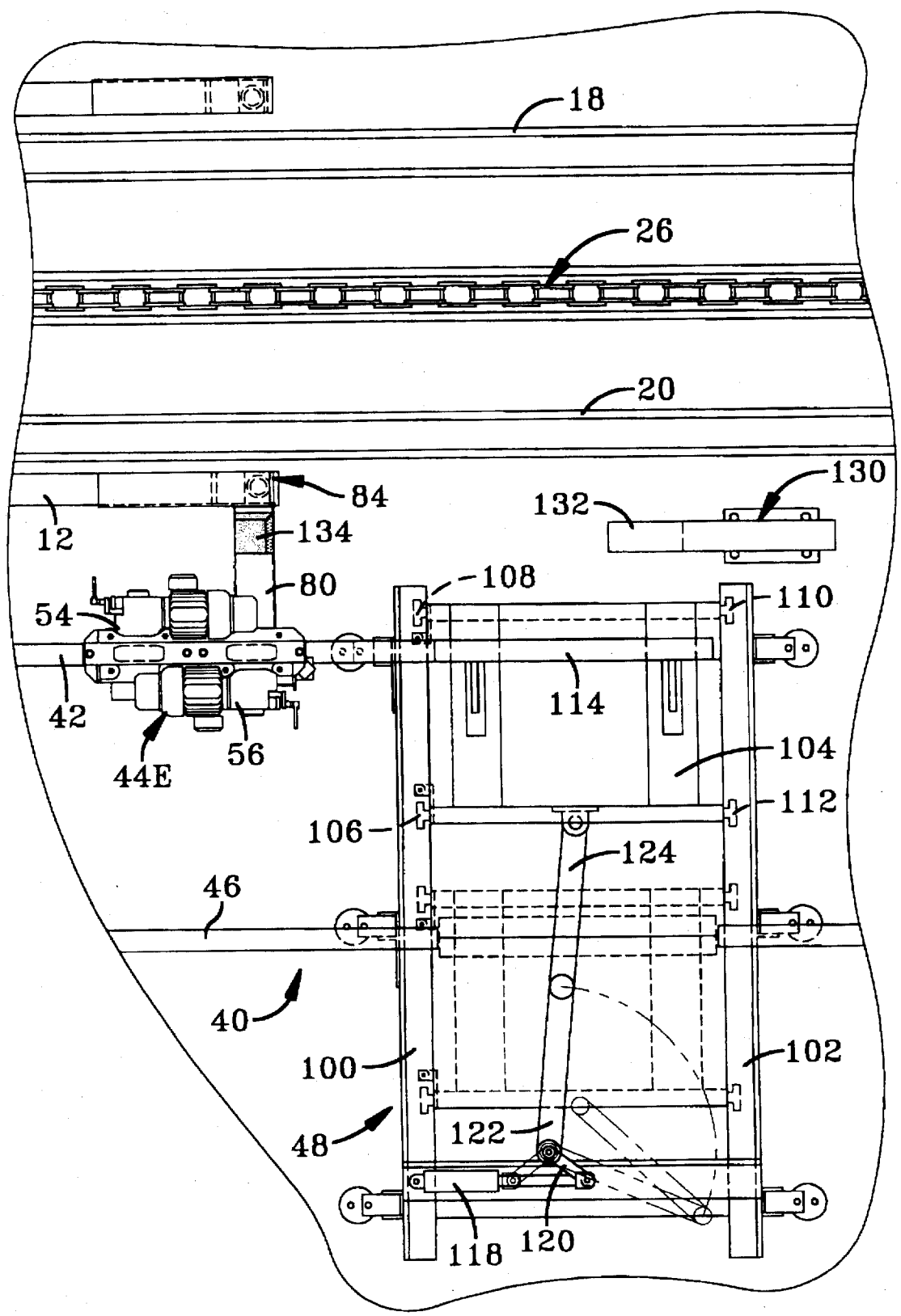
FIG. 3 is a enlarged fragmentary view of FIG. 1 showing the switch for transferring the drive tractors from the drive track to the return track.

As best seen in FIG. 3, the switch device 48 includes a pair of tracks 100 and 102 which extend transversely with respect to the drive track 42 and the return track 46. A carriage 104 is mounted on the tracks 100 and 102 by wheels 106, 108, 110 and 112. A length of track 114 is mounted on the carriage 104 and is normally positioned by the carriage 104 to be in end-to-end alignment with the drive track 42, as shown in FIG. 3. After uncoupling from the truck 12 at the pick-up point 38 the tractor 44 is driven off the end of the drive track 42 onto the track portion 114 where it is stopped. Then the hydraulic cylinder 118 is energized and operates through pivot links 120,122 and 124 to move the carriage 104 to the phantom line indicated position of FIG. 3 in which the rail 114 moves into end-to-end alignment with the return track 46. Then, the tractor 44 can be driven off the track portion 114 onto the return track 46 for return.

Operation

Referring to FIG. 1, it will be understood that the first conveyor drive 44 drives a truck 12 to the drop-off point 38 where the tractor 44A is awaiting the truck. The first conveyor drive 24 drives the truck 12 into engagement with the arm 80 of the waiting tractor 44A. As seen in FIG. 7, the pin 86 depending from truck 12 will ride against the entry ramp 92 to spring the arm 80 downwardly as shown in FIG. 5. Then, the spring 83 will return the arm 80 upwardly and the pin 86 is captured within the socket 88 of the arm. Upon further travel of the truck 12 under power of the first conveyor drive 24, the truck will push on the wall 90 of the arm 80 to push the tractor 44 along the track 42, thereby assuring a complete coupling engagement between the tractor arm 80 and the truck 12.

Upon command of a central computer control system, the tractor 44 is energized to carry the truck 12 along the drive rail 42. If the accumulating conveyor 40 is occupied by a plurality of properly spaced trucks, as shown in FIG. 1, the tractor will travel at a slow speed to match the speeds of the first conveyor drive 24 and the second conveyor drive 26. However, if there are any gaps in the accumulator system, the tractor 44 can drive the truck 12 rapidly to fill the gap.

Figure 6:
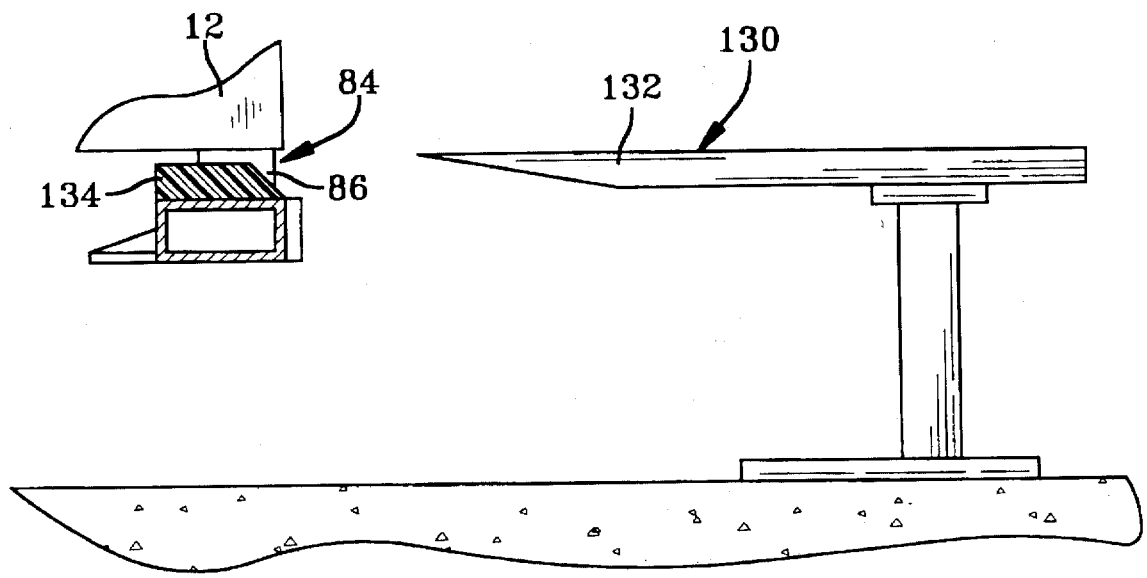
FIG. 6 is a section view taken in the direction of arrows 6—6 of FIG. 5 showing the inclined ramp on the end of the coupling arm for coupling the arm with the truck.

When a tractor reaches the pick-up point 38, the arm 80 of the tractor 44 comes into engagement with an uncoupling actuator 130, best shown in FIGS. 5 and 6. This uncoupling actuator 130 is a tapered arm 132 which mounts on the floor and reaches into the path of the arm 80 so that the arm 80 is depressed to its phantom line position of FIG. 5, thereby uncoupling the socket 88 of the arm 80 from the pin 86 of the truck 12. A nylon block 134 is mounted on the arm to provide low friction engagement between tractor arm 80 and tapered arm 132. Once uncoupled, the truck 44 is then ready for switching. Switch 48 is then operated to transfer the track portion 114 and truck 44 into alignment with the return track 46. The tractor 44 then shuttles along the return track 46 to the position of tractor 44F of FIG. 1. When needed, the switch device 50 will then transfer the tractor 44F onto the drive track 44.

In view of the foregoing, it will be understood that the accumulating conveyor system of this invention can be programmed to provide effective insulation of each of the conveyor drives 24 and 26 from stoppages of the other conveyor drive. In particular, when the accumulating conveyor system 40 of FIG. 1 is fully loaded, as shown in FIG. 1, a stoppage of the first conveyor drive 24 will not require a stoppage of the second conveyor drive 26 because trucks 12 can be progressively loaded onto the second conveyor drive 26 even though the first conveyor drive 24 has been stopped. Likewise, in those situations where there may be gaps between the trucks on the accumulating conveyor system 40, and then there is a stoppage of the second conveyor drive 26, the first conveyor drive 24 can continue to operate until the gaps are filled. Accordingly, it will be appreciated that the accumulating conveyor system 40 provides a buffer between the conveyor drive systems 24 and 26 so that routine short duration stoppages of the conveyors will not interrupt production on adjacent separate regions of the assembly line.

Furthermore, it will be understood that the person of ordinary skill in the art will be enabled to modify the teachings of the preferred embodiment within the scope of the claims to further adapt the invention to the environment of a particular assembly line and its conveyor system. For example, this invention is not limited to application in an automobile assembly plant, but could be used in other conveyor environments. Furthermore the invention is not limited to practice using the particular tractor, truck and switch designs shown in the preferred embodiment of the invention but, likewise may be adapted to other conveyor arrangements known in the industry.

Thus, the invention provides a new and improved accumulating conveyor system for shuttling conveyor trucks from a first conveyor drive to a second conveyor drive to insulate each of the conveyor drives from stoppage of the other conveyor drive.

We claim:

1. In a conveyor system of the type having a first conveyor drive driving a plurality of trucks along a conveyor track to a drop off point and a second conveyor drive spaced at a distance from the first conveyor drive for picking up the trucks at a pick up point and driving the trucks further along the conveyor track, an accumulating conveyor system for shuttling conveyor trucks from the first conveyor drive to the second conveyor drive to insulate each conveyor drive from a stoppage of the other conveyor drive, comprising:

a drive track extending parallel along the conveyor track;

a plurality of tractors adapted to selectively couple with a truck at the drop off point, tow the truck along the conveyor track to the pickup point of the second conveyor drive, and uncouple from the truck;

a return track extending parallel along the drive track for returning the tractors from the pick up point to the drop off point.

2. In a conveyor system of the type having a first conveyor drive driving a plurality of trucks along a conveyor track to a drop off point and a second conveyor drive spaced at a distance from the first conveyor drive for picking up the trucks at a pick up point and driving the trucks further along the conveyor track, an accumulating conveyor system for shuttling conveyor trucks from the first conveyor drive to the second conveyor drive to insulate the conveyor drives from a stoppage of the other conveyor drive, comprising:

a drive track extending parallel along the conveyor track;

a plurality of tractors adapted to selectively couple with a truck at the drop off point, tow the truck along the conveyor track to the pickup point of the second conveyor drive, and uncouple from the truck each of the tractors being individually controllable to stop, start, and travel independent of the other tractors;

a return track extending parallel along the drive track for returning the tractors from the pick up point to the drop off point; and a first tractor switch device for transferring the trucks from the drive track to the return track after uncoupling from the truck and a second tractor switch device for transferring the trucks from the return track to the drive track to await coupling with a truck.

3. In a conveyor system of the type having a first conveyor drive driving a plurality of trucks along a conveyor track to a drop off point and a second conveyor drive spaced at a distance from the first conveyor drive for picking up the trucks at a pick up point and driving the trucks further along the conveyor track, an accumulating conveyor system for shuttling conveyor trucks from the first conveyor drive to the second conveyor drive to insulate each conveyor drive from a stoppage of the other conveyor drive, comprising:

a drive track extending parallel along the conveyor track;

each truck having a coupling;

a plurality of tractors, each tractor having a coupler adapted to selectively couple with the coupling of a truck at the drop off point, tow the truck along the conveyor track to the pickup point of the second conveyor drive, and uncouple from the truck;

a return track extending parallel along the drive track for returning the tractors from the pick up point to the drop off point to await the next truck delivered to the drop off point by the first conveyor drive.

4. The accumulating conveyor system of claim 3 further characterized by the coupling of the truck comprising an arm reaching from the tractor into the path of movement of the truck, a pin and socket provided respectively on the truck and on the arm for engagement with one another to couple the tractor and the truck.

5. The accumulating conveyor system of claim 3 further characterized by an arm pivoted on the tractor and reaching from the tractor into the path of movement of the truck, a pin and socket provided respectively on the truck and on the arm for engagement with one another to couple the tractor and the truck; and an inclined entry ramp mounted on one of the tractor and the truck for pivoting the arm to accomplish a coupling of the pin and socket.

6. The accumulating conveyor system of claim 4 further characterized by an uncoupling actuator for pivoting the arm at the pick-up point to accomplish an uncoupling of the pin and socket.

7. The accumulating conveyor system of claim 2 further characterized by the switch device comprising a switching track portion adapted to receive a tractor thereon and then move laterally between alignment with the drive track to alignment with the return track to shift the tractor between the drive track and the return track.

* * * * *